US010381609B2

(12) United States Patent
Chamberlain et al.

(10) Patent No.: US 10,381,609 B2
(45) Date of Patent: Aug. 13, 2019

(54) STRUCTURES WITH INTEGRATED ALUMINUM-ION BATTERIES

(71) Applicant: CommScope Technologies LLC, Hickory, NC (US)

(72) Inventors: John C. Chamberlain, Hickory, NC (US); Morgan C. Kurk, Sachse, TX (US)

(73) Assignee: CommScope Technologies LLC, Hickory, NC (US)

( * ) Notice: Subject to any disclaimer, the term of this patent is extended or adjusted under 35 U.S.C. 154(b) by 441 days.

(21) Appl. No.: 15/210,020

(22) Filed: Jul. 14, 2016

(65) Prior Publication Data

US 2017/0033331 A1    Feb. 2, 2017

Related U.S. Application Data

(60) Provisional application No. 62/197,719, filed on Jul. 28, 2015.

(51) Int. Cl.
| | | |
|---|---|---|
| *H01M 10/054* | (2010.01) | |
| *H01M 2/02* | (2006.01) | |
| *H01M 2/06* | (2006.01) | |
| *H01M 2/10* | (2006.01) | |
| *H01M 4/133* | (2010.01) | |
| *H01M 4/134* | (2010.01) | |
| *H01M 2/20* | (2006.01) | |
| *H01M 4/587* | (2010.01) | |

(52) U.S. Cl.
CPC .......... *H01M 2/0277* (2013.01); *H01M 2/02* (2013.01); *H01M 2/0287* (2013.01); *H01M 4/133* (2013.01); *H01M 4/134* (2013.01); *H01M 10/054* (2013.01); *H01M 2/202* (2013.01); *H01M 4/587* (2013.01); *H01M 2220/10* (2013.01)

(58) Field of Classification Search
None
See application file for complete search history.

(56) References Cited

U.S. PATENT DOCUMENTS

2006/0021214 A1*  2/2006  Jenson ................. A61N 1/3787
                                                              29/623.1
2015/0249261 A1*  9/2015  Dai ..................... H01M 10/054
                                                                429/336

* cited by examiner

*Primary Examiner* — Haroon S. Sheikh
(74) *Attorney, Agent, or Firm* — Myers Bigel, P.A.

(57) ABSTRACT

Enclosures are provided having integrated aluminum-ion batteries. The enclosures may include a wall and an aluminum-ion battery that is at least partly integrated within the wall.

20 Claims, 3 Drawing Sheets

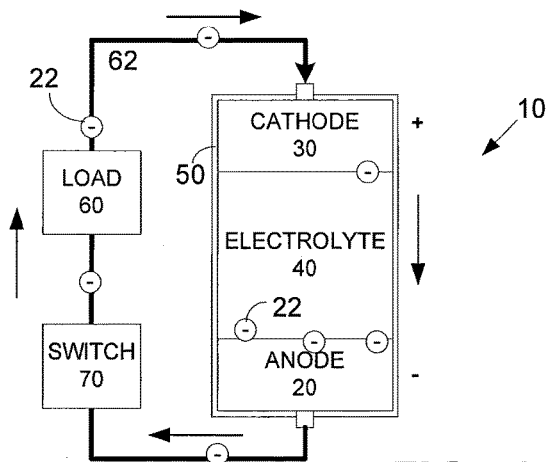
FIG. 1
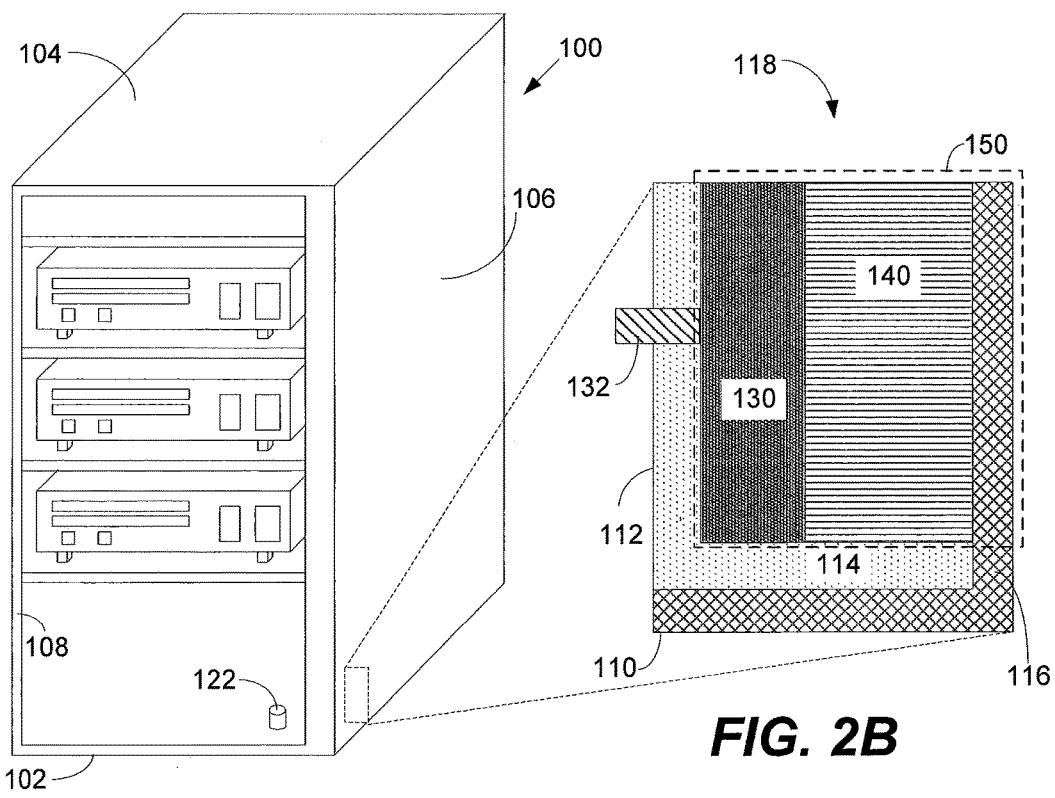
FIG. 2A
FIG. 2B

STRUCTURES WITH INTEGRATED ALUMINUM-ION BATTERIES

CROSS-REFERENCE TO RELATED APPLICATION

The present application claims priority under 35 U.S.C. § 119 to U.S. Provisional Patent Application Ser. No. 62/197,719, filed Jul. 28, 2015, the content of which is incorporated by reference herein in its entirety.

FIELD OF THE INVENTION

The present invention relates generally to batteries and, more particularly, to structures having aluminium-ion batteries integrated into structural elements thereof.

BACKGROUND

Research into aluminium-ion batteries has been underway as a replacement for conventional alkaline and lithium-ion batteries. Aluminum-ion batteries have a number of potential advantages over conventional batteries, including the potential for ultra-fast charging, high storage capacity, reduced production costs, extended battery life (i.e., an increased number of charging and discharging cycles without significant loss in capacity) and improved safety (since aluminium is non-flammable).

The proposed aluminium-ion batteries include an aluminium anode, a graphite cathode, and a magnesium salt that serves as the ionic liquid electrolyte.

SUMMARY

Pursuant to embodiments of the present invention, enclosures are provided that include a wall and an aluminum-ion battery that is at least partly integrated within the wall. The enclosure may be a rack or a cabinet in some embodiments. The wall may be a sidewall, floor or ceiling of the enclosure in some embodiments.

In some embodiments, the wall may be an aluminum wall that forms the anode of the aluminum-ion battery, a second structure that forms the cathode of the aluminum-ion battery, and an electrolyte material disposed between the anode and the cathode. The second structure may be a graphite structure. The enclosure may further include a dielectric separator that electrically isolates a bottom portion of the aluminum wall from the graphite structure.

In some embodiments, the enclosure may also include an anode contact that is electrically connected to the aluminum wall and a cathode contact that is electrically connected to the graphite structure. The enclosure may further include a coating of an electrically insulative material on at least a portion of the exterior thereof. In some embodiments, the wall may be an insulating wall having a cavity therein, and at least one aluminum sheet and at least one graphite sheet may be mounted in the cavity with an electrolyte material disposed therebetween.

Pursuant to embodiments of the present invention, enclosures are provided that include a wall having a cavity therein and at least one aluminum-ion battery integrated within the cavity of the wall. The enclosure may be a rack or a cabinet in some embodiments. The wall may be a sidewall, floor or ceiling of the enclosure in some embodiments.

In some embodiments, a plurality of aluminum-ion batteries may be integrated within the cavity. These aluminum-ion batteries may be electrically connected in series. The enclosure may further include a mounting structure within the cavity having a plurality of slots that receive respective aluminum anodes and graphite cathodes of the plurality of aluminum-ion batteries. The mounting structure may be a lower mounting structure that receives lower ends of the respective aluminum anodes and graphite cathodes, the enclosure may also include an upper mounting structure within the cavity having a plurality of slots that receive upper ends of the respective aluminum anodes and graphite cathodes of the plurality of aluminum-ion batteries.

In some embodiments, the enclosure may further include a coating of an electrically insulative material on at least a portion of an exterior of the enclosure. The aluminum anodes may be internal aluminum walls mounted within the cavity that provide structural support to the enclosure. In some embodiments, the aluminum anodes and the graphite cathodes may be sheets of aluminum and graphite, respectively, that are stacked in a parallel spaced-apart arrangement between an interior surface and an exterior surface of the wall.

BRIEF DESCRIPTION OF THE DRAWINGS

FIG. 1 is a schematic diagram illustrating the components and operation of an aluminium-ion battery.

FIG. 2A is a schematic perspective view of a cabinet according to embodiments of the present invention that includes an integrated aluminium-ion battery.

FIG. 2B is an enlarged cross-sectional view of one of the walls of the cabinet of FIG. 2A.

DETAILED DESCRIPTION

Figure 3A:
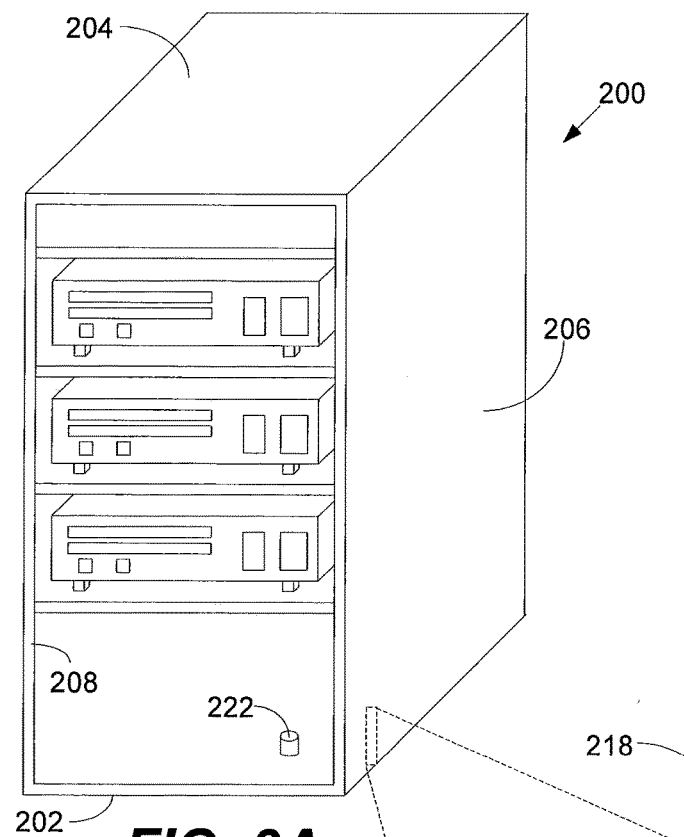
FIG. 3A is a schematic perspective view of a cabinet according to embodiments of the present invention that includes an integrated aluminium-ion battery.

Pursuant to embodiments of the present invention, structures are provided that have aluminium-ion batteries integrated into structural elements thereof. The structures according to embodiments of the present invention may have aluminium elements that may act both as structural supports as well as the anodes of aluminium-ion batteries. Accordingly, by using the aluminium elements in multiple ways it may be possible to reduce the size, weight, and cost associated with providing the structure and an associated battery. The structures may include storage structures such as equipment racks or cabinets and physical support structures such as towers, poles and the like (e.g., antenna towers).

In many existing applications, batteries such as back-up batteries are provided that are stored in an enclosure such as a cabinet, rack, shelf system or the like. By way of example, cellular base stations and computer data centers routinely include back-up batteries that are automatically brought online in the event of a power outage to keep the base station or data center operating during such power outages and/or until a backup generator may be brought online. These backup batteries are typically stored in a cabinet or other enclosure to protect the batteries. While the batteries for a cellular base station are often located at the bottom of an antenna tower or other structure, it will be appreciated that in some cases the batteries may be mounted on the tower or other structure by mounting the batteries on mounts, struts, poles or the like.

Pursuant to embodiments of the present invention, aluminium-ion batteries may be used to replace the conventional batteries that are used, for example, in the above-described applications, and the batteries also may be integrated into, for example, the walls, floor and/or ceiling of the enclosure or other structure (e.g., part of an antenna tower). In some embodiments, the structure may be formed of aluminium, and the aluminium may serve as the anode of the aluminium-ion battery. In other cases, the structure may be formed of other materials (e.g., steel, plastic, etc.) and may have a hollow floor, ceiling or walls that have aluminium-ion batteries integrated therein. In such embodiments, the aluminium anodes of the aluminum-ion batteries may be designed to structurally support the floor, ceiling and/or walls so that the aluminium serves the dual purpose of forming a component of the battery and also providing structural support. In some embodiments, an isolation mechanism such as a coating may be provided that electrically isolates the portion of the structure that acts as part of the battery from the remainder of the structure and/or from other structures.

Embodiments of the present invention will now be discussed in more detail with reference to the attached figures, in which example embodiments of the present invention are shown.

FIG. 1 is a schematic diagram illustrating the components and operation of an aluminium-ion battery 10. As shown in FIG. 1, the aluminium-ion battery 10 includes an anode electrode 20 ("anode"), a cathode electrode 30 ("cathode") and an electrolyte material 40 ("electrolyte") that is interposed therebetween. The electrolyte material 40 may be a liquid. The anode 20, cathode 30 and electrolyte material 40 may be enclosed in a housing 50. With respect to the aluminium-ion batteries 10 that are integrated into structures according to embodiments of the present invention, the anode 20 may be an aluminium anode, the cathode 30 may be, for example, a graphite cathode, and the electrolyte material 40 may be, for example, a complex magnesium salt. However, it will be appreciated that embodiments of the present invention are not limited to a specific type of aluminium-ion battery, and that any appropriate materials for the components of the aluminium-ion battery may be used.

Referring still to FIG. 1, the aluminium-ion battery 10 may operate as follows. Chemical reactions occur between the materials that form the anode 20, cathode 30 and electrolyte material 40 which cause electrons 22 to accumulate at the anode 20. As a result, a potential difference will exist between the anode 20 and the cathode 30. As electrons 22 have the same polarity charge, they tend to repel each other and seek to move with respect to each other to eliminate the potential difference. However, the electrolyte material 40 acts as a blocking medium that prevents the accumulated electrons 22 in the anode 20 from flowing to the cathode 30.

As is further shown in FIG. 1, a switch 70 and a load 60 such as, for example, a light bulb, an electrical circuit, etc. may be electrically connected in series between the anode 20 and the cathode 30. When the switch 70 is closed, an alternate path 62 exists between the anode 20 and the cathode 30. The accumulated electrons 22 in the anode 20 may then flow along this path alternate 62 to the cathode 30. Eventually, the accumulated electrons 22 are depleted, and the current between the anode 20 and the cathode 30 stops flowing. With rechargeable batteries, another power source is used to reverse the above-described electrochemical process so that electrons 22 again accumulate in the anode 20.

The amount of charge that the battery 10 can store is related to the surface area of the anode 20, as the chemical reaction between the anode 20 and the electrolyte material 40 results in the accumulation of electrons 22 that create the potential difference that allows current to flow. The more electrons 22 that are accumulated, the greater the amount of charge that may be stored. In applications where the batteries are provided to power relatively high power equipment such as the above examples of cellular base stations and data centers, the required battery charge may be very high, and hence a large number of relatively large batteries may be required.

Aluminium is commonly used to form various structures because of its high strength, low weight, and relatively low material costs. For example, airplane bodies, antenna towers, cabinets, enclosures such as cabinets and racks and many other structures are routinely formed at least in part of aluminium. In many cases, these structures will include large amounts of aluminium surface area that could be used to form the anode(s) of one or more aluminium-ion batteries. In other words, one or more structural elements (e.g., walls, beams, etc.) of the structure may also be part of the aluminium-ion battery. In other cases, a structural element of the structure may be formed of other materials such as steel, plastic or the like, and the aluminium-ion batteries may be integrated into hollowed-out regions within the structural element. In these embodiments, the aluminum electrodes may, for example, be designed to reinforce the structural element.

Turning now to FIGS. 2A and 2B, a structure according to embodiments of the present invention in the form of an equipment cabinet 100 is shown that has an aluminium-ion battery integrated therein. As shown in FIG. 2A, the cabinet 100 has a floor 102, a ceiling 104 and sidewalls 106, 108. Sidewall 106 is thicker than sidewall 108 in this embodiment. In the depicted embodiment, the cabinet 100 includes a plurality of shelves that have electronic equipment mounted thereon. Equipment cabinets such as cabinet 100 are routinely used in cellular base stations and computer data centers.

FIG. 2B is a greatly enlarged cross-sectional diagram illustrating the internal structure of small portion of sidewall 106 of the cabinet 100 of FIG. 2A. As shown in FIG. 2B, the sidewall 106 may comprise a multi-layered structure that forms an aluminium ion battery 150. In particular, the sidewall 106 may have a bottom surface 110, an interior wall 112, an exterior wall 116 and a ceiling (not shown in FIG. 2B). The bottom surface 110 may comprise an extension of the floor 102 that extends under the sidewall 106. The bottom surface 110 may be formed of aluminium. The exterior wall 116 may also be formed of aluminium and, in some embodiments, may be integral with the bottom surface 110. The interior wall 112 may extend vertically between the bottom surface 110 and the ceiling (not shown in FIG. 2B). The interior wall 112 may also include a lower extension 114 that extends onto the bottom surface 110. A similar upper extension (not shown) may extend outwardly from the interior wall 112 just below the ceiling. The interior wall 112 may be formed of any appropriate material such as, for example, plastic or another insulating material. The interior wall 112 may or may not be designed to provide structural support to the cabinet 100. The interior wall 112 and the exterior wall 116 together define a cavity 118 in the interior of the sidewall 106.

The cavity 118 is defined in the space between the lower extension 114 of the interior wall 112, the interior wall 112, the exterior wall 116 and the upper extension of the interior wall 112 that may be just below the ceiling. A graphite sheet 130 may be provided within the cavity 118, and may abut the interior wall 112. The graphite sheet 130 may extend from the lower extension 114 to the upper extension of the interior wall 112. An electrolyte material 140 may fill the remainder of the cavity 118 between the graphite sheet 130 and the exterior wall 116. The electrolyte material 140 may be a liquid in some embodiments.

The graphite sheet 130, the electrolyte material 140 and the aluminium exterior wall 116 may together form an aluminium-ion battery 150. In particular, the graphite sheet 130 may act as the cathode of the battery 150, the exterior wall 116 may act as the aluminium anode of the battery 150, and the electrolyte material 140 may act as the electrolyte of the battery 150. The lower extension 114 and the upper extension (not shown) of the interior wall 112 may electrically isolate the aluminium anode 120 from the graphite cathode 130 to prevent the battery 150 from discharging. As is further shown in FIGS. 2A-2B, an anode contact 122 (which is electrically connected to the anode 120 through the aluminium floor 102) and a cathode contact 132 may be provided that may be used to connect the battery 150 to electronic equipment or other circuitry.

The aluminium exterior wall 116 may be quite large, and hence may provide a large amount of surface area for the anode 120 of the battery 150. The aluminium exterior wall 116 may also comprise a structural component of the cabinet 100. If a liquid electrolyte material 140 is used, the interior wall 112 and the exterior wall 116 may form a waterproof seal to maintain the liquid electrolyte material 140 in the cavity 118 between the aluminium anode 120 and the graphite cathode 130. Sealing structures, elements or materials (not shown) may also be provided that facilitate forming a waterproof seal at intersections between the interior wall 112 (and the lower extension 114 and upper extension thereof) and the exterior wall 116.

Figure 3B:
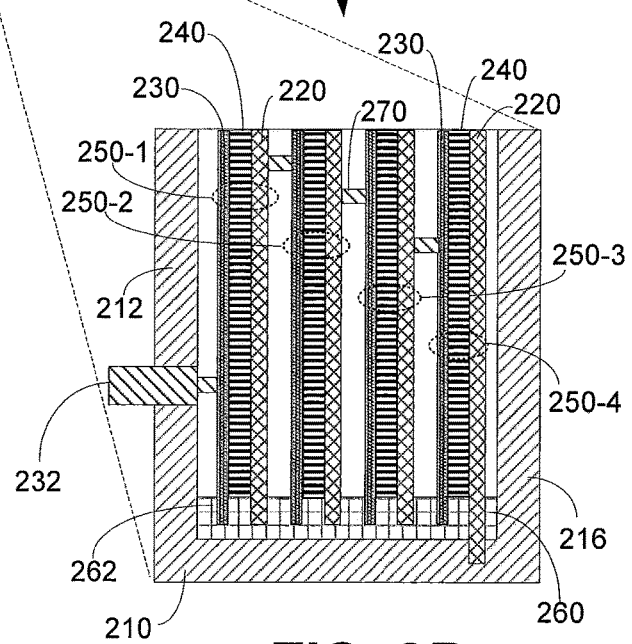
FIG. 3B is an enlarged cross-sectional view of one of the walls of the cabinet of FIG. 3A.

FIGS. 3A and 3B illustrate a structure according to further embodiments of the present invention in the form of an equipment cabinet 200 that has an aluminium-ion battery integrated therein. As shown in FIG. 3A, the cabinet 200 has a floor 202, a ceiling 204 and sidewalls 206, 208. The cabinet 200 also includes a plurality of shelves that have electronic equipment mounted thereon.

FIG. 3B is a greatly enlarged cross-sectional diagram illustrating the internal structure of small portion of sidewall 206 of the cabinet 200 of FIG. 3A. As shown in FIG. 3B, the sidewall 206 has a bottom surface 210, an interior wall 212, an exterior wall 216 and a ceiling (not shown in FIG. 3B). Each of the bottom surface 210, the interior and exterior walls 212, 216 and the ceiling may be formed of any appropriate material such as, for example, steel, plastic, aluminium or the like. The bottom surface 210, the interior and exterior walls 212, 216 and the ceiling may define a cavity 218 in the interior of sidewall 206.

A plurality of aluminium sheets 220 and a plurality of graphite sheets 230 (four of each are shown in FIG. 3B) are mounted in alternating order within the cavity 218 to provide a plurality of anode/cathode pairs 220/230. Electrolyte material 240 such as, for example, a magnesium salt, is provided between each anode/cathode pair 220/230. The aluminium sheets 220 and the graphite sheets 230 may be mounted in a dielectric mounting structure 260 that is positioned on the bottom surface 210 of the sidewall 206. The dielectric mounting structure 260 may include a plurality of slots 262, and each aluminium sheet 220 and each graphite sheet 230 may be positioned in a respective one of the slots 262 to maintain each sheet 220, 230 in an upright position and at a proper distance from adjacent sheets 220, 230. An identical dielectric mounting structure 260 (not shown) may be turned upside down and mounted in the upper portion of the cavity 218 (i.e., touching the ceiling thereof) and may have slots 262 that receive the respective upper portion of each sheet 220, 230.

As shown in FIG. 3B, each aluminium sheet 220 may form an aluminium anode, and each graphite sheet 230 may form a cathode 230 so that the aluminum and graphite sheets 220, 230 along with the electrolyte material 240 form a battery 250 that comprises a plurality of individual aluminium-ion batteries 252-1 through 252-4 within the cavity 218. Conductive plugs 270 electrically connect each cathode 230 to the anode 220 of an adjacent battery (for batteries 252-2 through 252-4) or to a cathode contact 232 that is provided in the interior wall 212 (for battery 25021). An anode contact 222 is electrically connected to the anode 220 of battery 252-4 through the aluminium floor 202 and the bottom surface 210 of sidewall 206, which in this embodiment is formed of an electrically conductive material. The anode contact 222 and the cathode contact 232 may be used to connect the battery 250 to electronic equipment or other circuitry.

The individual aluminium-ion batteries 252-1 through 252-4 that are integrated into the sidewall 206 may have anodes 220 with a large amount of surface area that may store a significant amount of charge, and a plurality of such batteries 252 may be integrated into a single sidewall. Moreover, the aluminium anodes 220 and graphite cathodes 230 may provide structural support to the sidewall 206, allowing for less other material to be used to form the interior and exterior walls 212, 216. While in FIGS. 3A and 3B the battery 250 is formed in one of the sidewalls of the structure, it will be appreciated that in other embodiments, the battery 250 may alternatively or additionally be formed in the floor and/or ceiling of the structure. It will also be appreciated that separate and distinct batteries may be formed, for example, in a sidewall and in the floor/ceiling or a single battery may be formed that extends through more than one wall (e.g., a sidewall and the ceiling or floor).

Figure 4A:
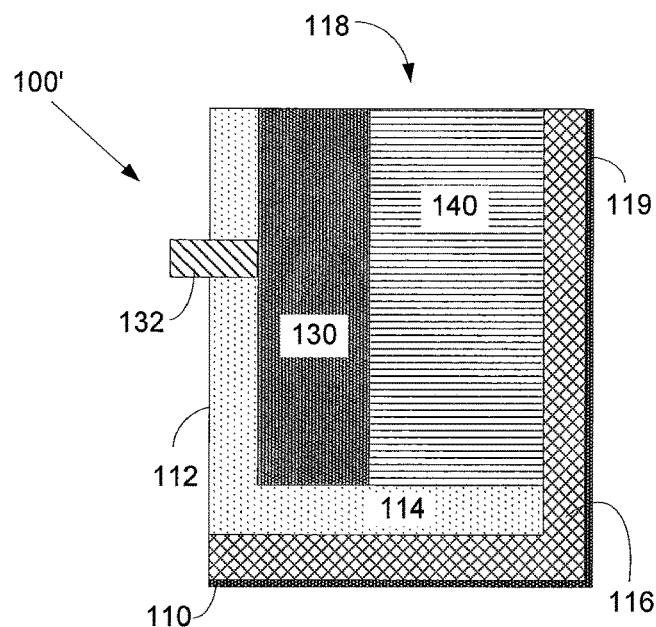
FIGS. 4A and 4B are enlarged cross-sectional views of small portions of enclosures according to further embodiments of the present invention.
Figure 4B:
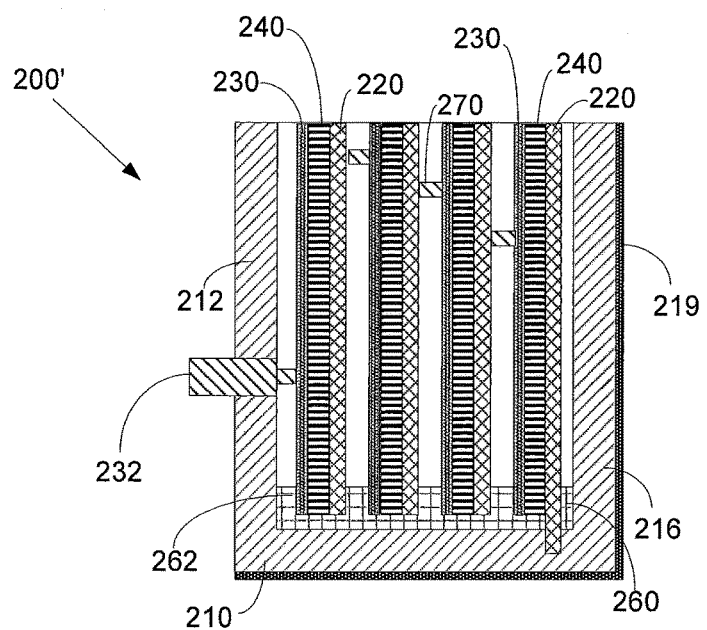

FIGS. 4A and 4B are enlarged cross-sectional views of small portions of enclosures according to further embodiments of the present invention where a coating is applied to the enclosure to electrically isolate the enclosure from other structures (or to electrically isolate a portion of the enclosure from the remainder of the enclosure).

In particular, FIG. 4A corresponds to the cross-sectional view of FIG. 2B discussed above that illustrates a small portion of an exterior wall of a cabinet 100' that is very similar to the cabinet 100 described above. As shown in FIG. 4A, the one difference between the cabinet 100 and the cabinet 100' is that the cabinet 100' includes a coating 119 that is provided on the outer surface of the exterior walls (including the floor and ceiling) thereof. The coating 119 may comprise an electrically insulating material. The coating 119 may electrically isolate the cabinet 100' from other structures such as, for example, adjacent cabinets. It will be appreciated that interior walls and/or shelves of the cabinet 100' may also include the coating 119. Further description of the cabinet 100' will be omitted as it may be identical in all other respects to the cabinet 100 that is described above.

FIG. 4B corresponds to the cross-sectional view of FIG. 3B discussed above that illustrates a small portion of an exterior wall of a cabinet 200' that is very similar to the cabinet 200 described above. As shown in FIG. 4B, the one difference between the cabinet 200 and the cabinet 200' is that the cabinet 200' includes a coating 219 that is provided on the outer surface of the exterior walls (including the floor and ceiling) thereof. The coating 219 may comprise an electrically insulating material. The coating 219 may electrically isolate the cabinet 200' from other structures such as, for example, adjacent cabinets. It will be appreciated that interior walls and/or shelves of the cabinet 200' may also include the coating 219. Further description of the cabinet 200' will be omitted as it may be identical in all other respects to the cabinet 200 that is described above.

While the aluminium anodes 120, 220 of batteries 150, 250 are sacrificial in a sense as they are used to generate the ions, the loss of aluminium may be sufficiently small so that the aluminium may retain structural integrity.

While the disclosure above has focused on aluminium-ion batteries as an example, it will be appreciated that other types of batteries may be integrated into structural elements in the same or similar fashion pursuant to further embodiments of the present invention. It will likewise be appreciated that while various cabinets have been exemplified as the structure in which the aluminium-ion batteries are integrated, a wide variety of other structures could similarly have batteries integrated into the walls, floor, ceilings or other elements thereof. For example, in other embodiments, the aluminium-ion batteries could be integrated into structural members of an antenna tower.

The present invention has been described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. Like numbers refer to like elements throughout the specification and drawings. It will also be appreciated that the embodiments disclosed above can be combined in any way and/or combination to provide many additional embodiments.

It will be understood that, although the terms first, second, etc. are used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. An enclosure, comprising:
    a wall; and
    an aluminum-ion battery that is at least partly integrated within the wall,
    wherein the wall comprises an aluminum wall that forms an anode of the aluminum-ion battery, a second structure that forms a cathode of the aluminum-ion battery, and an electrolyte material disposed between the anode and the cathode.

2. The enclosure of claim 1, wherein the second structure comprises a graphite structure.

3. The enclosure of claim 2, further comprising a dielectric separator that electrically isolates a bottom portion of the aluminum wall from the graphite structure.

4. The enclosure of claim 2, further comprising an anode contact that is electrically connected to the aluminum wall and a cathode contact that is electrically connected to the graphite structure.

5. The enclosure of claim 1, wherein the wall is a sidewall of the enclosure.

6. The enclosure of claim 1, wherein the wall is a ceiling or floor of the enclosure.

7. The enclosure of claim 5, wherein the enclosure is a rack or a cabinet.

8. The enclosure of claim 2, further comprising a coating of an electrically insulative material on at least a portion of an exterior of the enclosure.

9. The enclosure of claim 1, wherein the electrolyte material is a liquid electrolyte.

10. An enclosure, comprising:
    a wall having a cavity therein; and
    at least one aluminum-ion battery integrated within the cavity of the wall,
    wherein the at least one aluminum-ion battery comprises a liquid electrolyte.

11. The enclosure of claim 10, wherein a plurality of aluminum-ion batteries are integrated within the cavity.

12. The enclosure of claim 11, wherein the plurality of aluminum-ion batteries are connected in series.

13. The enclosure of claim 12, further comprising a mounting structure within the cavity having a plurality of slots that receive respective aluminum anodes and graphite cathodes of the plurality of aluminum-ion batteries.

14. The enclosure of claim 13, wherein the mounting structure comprises a lower mounting structure that receives lower ends of the respective aluminum anodes and graphite cathodes, the enclosure further comprising an upper mounting structure within the cavity having a plurality of slots that receive upper ends of the respective aluminum anodes and graphite cathodes of the plurality of aluminum-ion batteries.

15. The enclosure of claim 10, wherein the wall is a sidewall of the enclosure.

16. The enclosure of claim 14, wherein the enclosure is a rack or a cabinet.

17. The enclosure of claim 10, further comprising a coating of an electrically insulative material on at least a portion of an exterior of the enclosure.

18. The enclosure of claim 13, wherein the aluminum anodes comprise internal aluminum walls mounted within the cavity that provide structural support to the enclosure.

19. The enclosure of claim 13, wherein the aluminum anodes and the graphite cathodes comprise sheets of aluminum and graphite, respectively, that are stacked in a parallel spaced-apart arrangement between an interior surface and an exterior surface of the wall.

20. An enclosure, comprising:
an aluminum wall; and
an aluminum-ion battery that is at least partly integrated within the aluminum wall,
wherein the enclosure comprises a cabinet and the aluminum-ion battery comprises a back-up battery, and
wherein the aluminum wall comprises an anode of the aluminum-ion battery.

* * * * *